United States Patent [19]

Witter

[11] 4,142,136

[45] Feb. 27, 1979

[54] CONTROL CIRCUIT FOR STARTING A MOTOR

[75] Inventor: James S. Witter, Clarence Center, N.Y.

[73] Assignee: Mollenberg-Betz Machine Company, Buffalo, N.Y.

[21] Appl. No.: 785,926

[22] Filed: Apr. 8, 1977

[51] Int. Cl.² ............................................. H02P 5/40
[52] U.S. Cl. .................................... 318/779; 318/786; 318/416
[58] Field of Search .................... 318/227, 230, 416

[56] References Cited

U.S. PATENT DOCUMENTS

| | | | |
|---|---|---|---|
| 3,045,163 | 7/1962 | Collom | 318/227 |
| 3,143,694 | 8/1964 | Chiasson | 318/227 |
| 3,189,810 | 6/1965 | MacGregor | 318/227 |
| 3,573,580 | 4/1971 | Shinozaki | 318/227 |
| 3,652,924 | 3/1972 | Dieterich et al. | 318/227 |
| 3,742,370 | 6/1973 | Hansen | 318/227 |
| 4,015,178 | 3/1977 | Phillot et al. | 318/227 |

Primary Examiner—Gene Z. Rubinson
Attorney, Agent, or Firm—Sommer & Sommer

[57] ABSTRACT

A control circuit is adapted for use with a power supply circuit having a motor arranged in series with an SCR starter assembly and a power source, and having a bypass circuit arranged in parallel with the SCR starter assembly. The control circuit includes an operator for a main contactor arranged between the SCR assembly and the power source, an operator for a bypass contactor arranged in the bypass circuit, and a trigger circuit for operating the SCR starter assembly. The control circuit includes three timers for sensing three successive time intervals. Activation of the main operator closes the main switch and causes the first timer to begin counting a first time interval. After the first time interval, the SCR trigger circuit is fired to operate the SCR starter assembly and to limit the in-rush current supplied to the motor, and to cause the second timer to begin to count a second time interval. After the motor has reached its operating speed, the end of the second time interval causes the bypass operator to close the bypass contactor, and also causes the third timer to begin counting the third time interval. After the third time interval, the SCR trigger circuit is deactivated, to effectively remove the SCR starter assembly from the power supply circuit.

7 Claims, 2 Drawing Figures

CONTROL CIRCUIT FOR STARTING A MOTOR

BACKGROUND OF THE INVENTION

1. Field of the Invention

The present invention relates generally to a control circuit for operating a power supply circuit having a SCR starter, and more particularly to an improved control circuit for supplying operating current to a motor through a bypass circuit and for effectively disconnecting the SCR starter assembly after the motor has reached the operating speed.

2. Description of the Prior Art

When a motor is initially connected to a power source, the in-rush current supplied to the motor may exceed the nameplate current by a factor of from five to seven times. This has the possible delitescent effect of either exceeding the power supply capability, or interfering with other users of such power supply, or both.

In order to limit this in-rush current, it is known to provide an SCR starter between the power source and the motor. However, after the motor has reached its operating speed, it is also desirable to effectively remove the SCR starter from the power supply circuit to prevent unnecessary wear on the starter assembly and to prevent possible imbalance in power supplied to the operating motor. To accomplish this, it is further known to provide a bypass circuit around the SCR starter. Hence, after the motor has reached its operating speed, operating current may thereafter be supplied through the bypass circuit, and the SCR starter may be thereafter disconnected or deactivated.

One example of such known circuit is shown in Canadian Patent No. 796,414, which provides for simultaneous completion of the bypass circuit and deactivation of the SCR starter.

However, such simultaneous switching has a number of significant disadvantages. As a practical matter, it is virtually impossible to effect simultaneous switching. If the SCR starter is disconnected before the bypass circuit is completed, the subsequent closure of the bypass circuit may again cause an in-rush current. Moreover, arcing may occur if the SCR starter is deactivated before the SCR bypass circuit is completed.

SUMMARY OF THE INVENTION

The present invention overcomes the foregoing disadvantages by providing an improved control circuit which is adapted to be used with a power supply circuit having a motor arranged in series with an SCR starter assembly and a power source, and having a bypass circuit arranged in parallel with the SCR starter. The inventive control circuit insures that the bypass circuit will be completed before the SCR starter is deactivated.

The control circuit may be operatively associated with the power supply circuit for limiting the in-rush current supplied to the motor when the motor is initially started, and for supplying operating current to the motor through the bypass circuit after the motor has reached its operating speed. The control circuit includes first, second and third branch circuit means connected to a suitable source of control voltage, and these three branch circuits are arranged in parallel with one another. The first branch circuit means has a selectively operable control switch, has a main operator arranged to close the main contactor when the control switch is closed, and has a first timer arranged to measure a first time interval after the main operator has been operated. The second branch circuit means has a trigger circuit operatively arranged to fire the SCR starter after the first time interval, and has a second timer for measuring a second time interval after the trigger circuit has been operated. The third branch circuit means has a bypass operator operatively arranged to close the bypass contactor after the second time interval, and has a third timer for measuring a third time interval beginning when the bypass operator has been operated, and is arranged to open the second branch circuit after the third time interval. In this manner, the inventive control circuit may limit the in-rush current supplied to the motor when the motor is initially started, and may supply operating current through the bypass circuit to the motor after such motor has reached its operating speed.

Accordingly, one object of the present invention is to provide an improved controlled circuit for limiting the in-rush current supplied to a motor when such motor is initially started.

Another object is to provide an improved control circuit which causes operating current to be supplied to a motor through a bypass circuit after the motor has reached its operating speed.

Another object is to provide an improved control circuit which deactivates an SCR starter from the power supply circuit after current is supplied to the motor through a bypass circuit.

Another object is to provide an improved control circuit which insures that the bypass circuit is completed before the SCR starters are deactivated.

These and other objects and advantages will become apparent from the foregoing and ongoing description, the drawings, and the appended claims.

DESCRIPTION OF THE PREFERRED EMBODIMENTS

Figure 1:
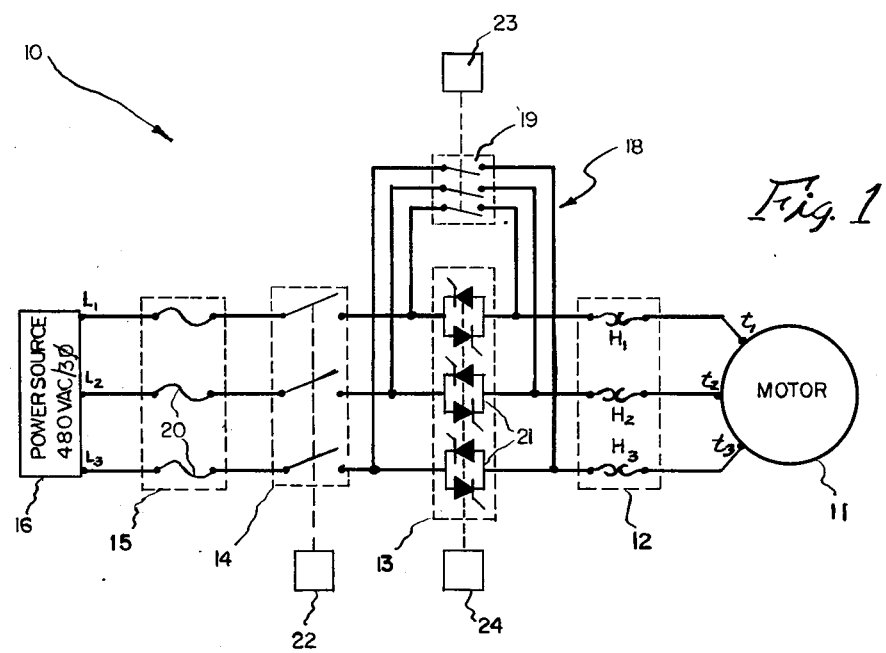
FIG. 1 is an electrical schematic of a power supply circuit, this view showing the motor arranged in series with the SCR starter and the power source, showing the bypass circuit, and further showing the main operator, the bypass operator, and the trigger circuit for firing the SCR starter.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring initially to FIG. 1, a power supply circuit, generally indicated at 10, is illustrated as including, in series, a three phase motor 11; an overload bank, collectively indicated at 12; an SCR starter assembly, collectively indicated at 13; a main contactor or switch 14; a fuse bank, collectively indicated at 15; and circuit input terminals $L_1$, $L_2$ and $L_3$ which are adapted to receive 480 V.A.C., three phase, 60 Hz power from a suitable source 16. Moreover, this circuit 10 is shown as further including a bypass circuit, generally indicated at 18, arranged in parallel with the SCR starter assembly 13, and this bypass circuit includes a bypass contactor or switch 19. Thus, when the bypass switch 19 is open, the three circuit input terminals $L_1$, $L_2$ and $L_3$ are connected to motor terminals $t_1$, $t_2$ and $t_3$ by series circuits severally including a fuse or circuit breaker 20, a closed pole of main contactor 14, and SCR starter 21, and an overload heater H. It will be noted that the opening and closing of main contactor 14 may be controlled by main switch operator 22. Similarly, the opening and closing of bypass contactor 19 may be controlled by bypass contactor operator 23. Also, the operation of each SCR starter 21 of SCR starter assembly 13 may be controlled by a trigger circuit or relay 24.

A person skilled in this art will recognize that, were it not for the presence of the SCR starter assembly, when the main contactor is closed to supply power directly to the motor, the high initial in-rush current might exceed the rated or nameplate current by a factor of from five to seven times, and such in-rush current, even though temporary, might exceed the current supply capability or interfere with other equipment operating on such supplied power. To this end, the SCR starters are operatively positioned between the motor and the power source to limit this in-rush current. However, it is also desirable to effectively disconnect these SCR starters from the power circuit after the motor has reached its operating speed. By so removing these SCR starters after they have performed their initial in-rush current limiting function, unnecessary wear on these elements and possible imbalance between the three wire power supply circuit may be eliminated. The bypass circuit is provided for this function. Specifically, after the motor has reached its operating speed, the bypass contactor operator 23 is operated to close bypass contactor 19 to provide an alternative current path around the SCR starter assembly, after which the trigger circuit or relay 24 may be operated to deactivate the SCR assembly and effectively remove it from the power supply circuit.

Figure 2:
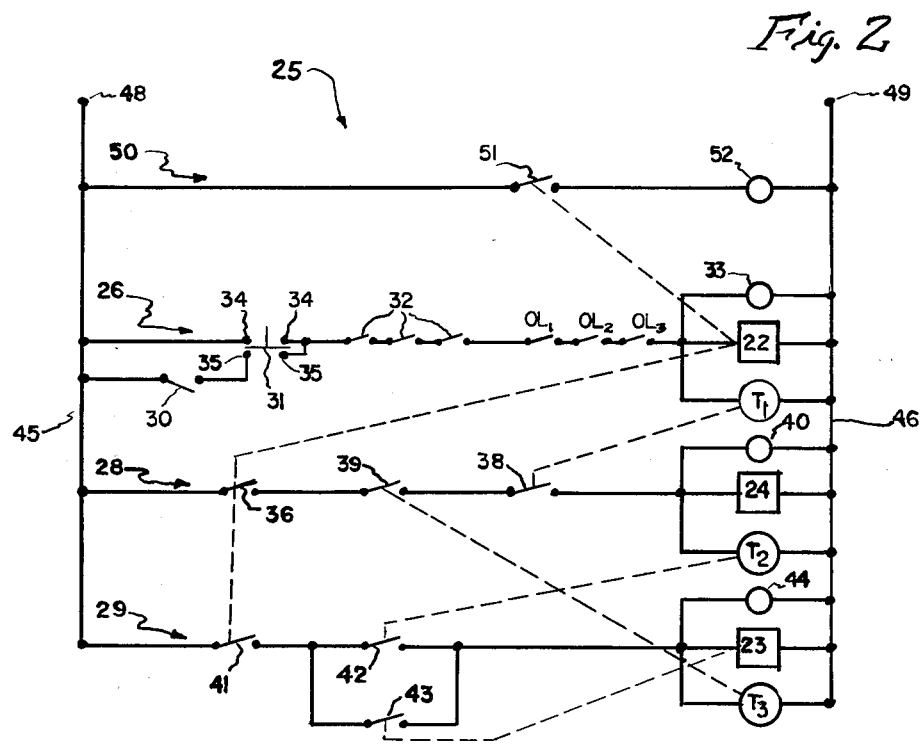
FIG. 2 is an electrical schematic of the control circuit, this view showing the first branch circuit as including main operator and the first timer, showing the second branch circuit as including the trigger circuit and the second timer, and showing the third branch circuit as including the bypass operator and the third timer.

Referring now to FIG. 2, the inventive control circuit, of which a presently preferred embodiment is generally indicated at 25, is operatively associated with the power circuit for limiting the in-rush current supplied to the motor when the motor is initially started, and for supplying current to the motor through the bypass circuit after the motor has reached its operating speed.

The control circuit 25 includes first branch circuit means 26, second branch circuit means 28 arranged in parallel with the first branch circuit means, and third branch circuit means 29 also arranged in parallel with the first branch circuit means.

Specifically, the first branch circuit means 26 is shown as including a control switch 30; a selector switch 31; a plurality of safety devices, severally indicated at 32; of plurality of overload switches, indicated at $OL_1$, $OL_2$ and $OL_3$ and arranged to sense the heat generated by overload heaters $H_1$, $H_2$ and $H_3$ respectively; main contactor operator 22; timer $T_1$; and indicator lamp 33. The selector switch 31 is arranged to be moved to complete the first branch circuit across terminals 34, 34, this indicating a manual operation; or may be moved to complete a parallel branch circuit including the control switch 30 across terminals 35, 35, this indicating an automatic operation. Thus, for example, if motor 11 were used to power refrigeration apparatus, control switch 30 might be thermostatically controlled to close whenever the temperature sensed by such thermostat exceeded a predetermined maximum temperature. However, it should be clearly understood that the inventive control circuit is not limited to this illustrative application, and possesses a more general utility apart from this specific application. The safety switches 32 are normally-closed and may be arranged to sense system parameters, such as oil pressure and refrigerant pressure. If such sensed parameters remain within operating limits, safety switches 32 will remain closed. However, if any one of such sense parameters exceeds a predetermined minimum or maximum value, the appropriate safety switch will open to disable the first branch circuit, and the power supply circuit. As previously noted, overload switches $OL_1$, and $OL_2$ and $OL_3$ are operatively arranged to sense the temperature of overload heaters $H_1$, $H_2$ and $H_3$, respectively. Thus, if any of these heaters becomes overloaded, the appropriate overload switch will open to disable the first branch circuit, and the power supply circuit. The timer $T_1$ and the indicator lamp 33 are severally arranged in parallel with the main switch operator 22. Thus, when the first branch circuit is completed to cause the main operator 22 to close the main switch contactor 14, the indicator lamp 33 will be illuminated and the timer $T_1$ will be activated to begin counting a first time interval.

The second branch circuit means 28 is shown as including a switch 36 remotely controlled by main operator 20 and arranged to be closed when the main operator has closed the main contactor; a first switch 38 remotely controlled by timer $T_1$ and arranged to be closed when the timer $T_1$ senses the end of the first time interval; a normally-closed second switch 39; SCR trigger circuit 24; indicator lamp 40; and timer $T_2$. Switches 36, 38 and 39 are arranged in series with SCR trigger circuit 22. Indicator lamp 40 and timer $T_2$ are severally arranged in parallel with the trigger circuit 24. Thus, when each of switches 36, 38 and 39 is closed to complete the second branch circuit and to fire or operate the trigger circuit, indicator lamp 40 will be illuminated. At the same time, timer $T_2$ will begin to count a second timer interval after the trigger circuit has fired.

The third branch circuit means 29 is shown as including a switch 41 remotely controlled by main operator 22 and arranged to be closed when the main operator has closed the main contactor; a third switch 42 controlled by timer $T_2$ and arranged to be closed after timer $T_2$ senses the end of the second time interval; and interlock switch 43 arranged in parallel with the third switch 42; bypass operator 23; indicator lamp 44; and timer $T_3$. In this third branch circuit, switches 41 and 42 are arranged in series with bypass operator 23. Interlock switch 43 is arranged in parallel with third switch 42, and indicator lamp 44 and timer $T_3$ are severally arranged in parallel with bypass operator 23. Thus, when switches 41 and 42 are closed to cause operator 23 to close the bypass contactor, lamp 44 will be illuminated and timer $T_3$ will begin to count a third time interval. Switch 39 is remotely controlled by timer $T_3$ and is arranged to open at the end of the third time interval. Thus, after the third time interval, switch 39 will open to interrupt the second branch circuit. Interlock switch 43 is remotely controlled by bypass operator 23 and is arranged to be closed when the bypass operator causes the bypass contactor to close. The closing of interlock switch 43 provides an alternative path around third switch 42, which opens after the second time interval. The first, second and third branch circuits are severally connected to common wires 45, 46 connected to control circuit input terminals 48, 49, and are severally arranged in parallel with one another. Of course, a control voltage is impressed on control circuit terminals 48, 49 from a suitable source (not shown).

If desired, the control circuit 25 may further include a fourth branch circuit 50 also connected to common wires 45, 46 and arranged in parallel with the first branch circuit. This fourth branch circuit 50 is shown as including a normally-closed switch 51 remotely controlled by main operator 32 and arranged to be open when the first branch circuit is completed, and indicator lamp 52. Thus, in the illustrative refrigeration application, switch 51 will be closed and lamp 52 will be illuminated when the motor is at rest, this indicating a "ready" condition.

Thereafter, when the thermostat senses a need for cooling, control switch 30 will close to cause main operator 22 to close main contactor 14. Activation of operator 22 opens switch 51 and closes switches 36 and 41. Also, indicator lamp 33 is illuminated and timer $T_1$ begins to count the first time interval. The second branch circuit is interrupted by open switch 38, and the third branch circuit is interrupted by open switches 42 and 43.

After timer $T_1$ senses the end of the first time interval, switch 38 closes to complete the second branch circuit. This causes trigger circuit 24 to fire the SCR starters and limit initial in-rush current supplied to the motor. At the same time, timer $T_2$ begins to count the second time interval. The length of the second time interval is greater than the amount of time needed for the motor to reach its operating speed.

After the motor has reached its operating speed, timer $T_2$ senses the end of the second time interval and closes switch 42 to cause bypass operator 23 to close bypass contactor 19. In this condition, operating current may be supplied to the motor through the SCR starter assembly 13, and through the bypass circuit 18. Activation of bypass operator 23 simultaneously closes interlock switch 43, and causes timer $T_3$ to begin counting the third time interval. After the end of the third time interval, timer $T_3$ opens switch 39 to interrupt the second branch circuit, to deactivate the SCR trigger circuit, and to effectively remove the SCR starter assembly from the power supply circuit. However, current may be continuously supplied to the motor through bypass circuit 19. When switch 39 is opened, timer $T_2$ is deactivated, and this causes switch 42 to open. However, the third branch circuit is still completed by the closed interlock switch 43.

Therefore, the inventive control circuit may be operatively associated with the power circuit for limiting the in-rush current supplied to the motor when the motor is initially started, and for supplying current to the motor through the bypass circuit after the motor has reached its operating speed. Persons skilled in this art will appreciate that the inventive control circuit is not limited to controlling power supplied to a three phase motor, but may as well be used with two phase or single phase motors as desired. Also, the length of the second time interval should be greater than the length of time needed for the motor to reach its operating speed. The length of the first and second time intervals should provide sufficient delay as to insure smooth and continuous power supply.

Therefore, while a preferred embodiment of the present invention has been shown and described, persons skilled in this art will appreciate that various additional changes and modifications may be made without departing from the spirit of the invention which is generically defined in the following claims.

What is claimed is:

1. In a power supply circuit having a motor arranged in series with an SCR starter and a power source, and having a bypass circuit arranged in parallel with said SCR starter, said power supply circuit further including a main contactor operatively arranged between said SCR starter and said power source, and a bypass contactor arranged in said bypass circuit, the improvement which comprises:

a control circuit operatively associated with said power supply circuit for limiting the in-rush current supplied to said motor when said motor is initially started, and for supplying current to said motor through said bypass circuit after said motor has reached its operating speed, said control circuit including first branch circuit means arranged to be supplied with a control voltage and having a selectively operable control switch, having a main operator operatively arranged to close said main contactor when said control switch is closed, and having a first timer for measuring a first time interval after said main operator has been operated;

second branch circuit means arranged in parallel with said first branch circuit means and having a trigger circuit operatively arranged to fire said SCR starter after said first time interval, and having a second timer for measuring a second time interval after said trigger circuit has been operated; and third branch circuit means arranged in parallel with said first branch circuit means and having a bypass operator operatively arranged to close said bypass contactor after said second time interval, having a third timer for measuring a third time interval after said bypass operator has been operated, and having means for opening said second branch circuit after said third time interval;

whereby said SCR starter may be removed from said power supply circuit after said third time interval.

2. The improvement as set forth in claim 1 wherein said first timer is arranged in parallel with said main operator.

3. The improvement as set forth in claim 1 wherein said second branch circuit means includes a first switch controlled by said first timer and arranged to be closed after said first time interval.

4. The improvement as set forth in claim 1 wherein said second branch circuit means includes a second switch controlled by said third timer and arranged to be opened after said third time interval.

5. The improvement as set forth in claim 1 wherein said third branch circuit means includes a third switch controlled by said second timer and arranged to be closed after said second time interval, and further includes an interlock circuit arranged in parallel with said third switch and having a fourth switch controlled by said bypass operator and arranged to be closed after said third time interval.

6. The improvement as set forth in claim 1 wherein said third timer is arranged in parallel with said bypass operator.

7. The improvement as set forth in claim 1 wherein a fifth switch is arranged in said second branch circuit means and a sixth switch is arranged in said third branch circuit means, and wherein said fifth and sixth switches are controlled by said main operator and are arranged to be closed when said main operator is operated to close said main switch.

* * * * *